United States Patent Office 3,261,452
Patented July 19, 1966

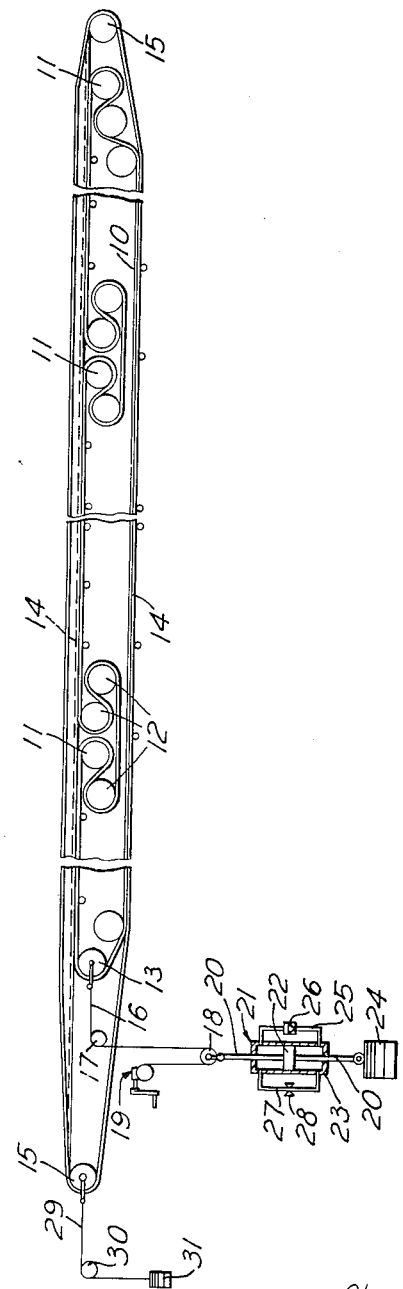

3,261,452
TENSIONING MEANS FOR A BELT CONVEYOR
Charles Thomson, Esher, England, assignor to Solar Thomson Engineering Company Limited, Cobham, Surrey, England
Filed Jan. 4, 1965, Ser. No. 423,159
Claims priority, application Great Britain, Jan. 10, 1964, 1,242/64
7 Claims. (Cl. 198—208)

This invention relates to tensioning means for an endless flexible driving member of the kind which drives an endless conveyor member by frictional engagement therewith over a substantial part of the length of the driving member.

The invention relates particularly, but not exclusively, to tensioning means for a belt conveyor having an endless conveyor belt wrapping and intended to be driven by frictional engagement with the upper flight of at least one endless driving belt trained around end drums or rollers and driven by a series of motors.

In such a conveyor, when the conveyor belt is loaded for part of its length, surplus power is generated by the motors on empty sections of said belt, wherever they may be, and this surplus power is transmitted along the empty flight of the driving belt to the tail end drum or roller, and along the lower flight of the driving belt to the head end drum or roller, and then along to the loaded sections of the conveyor belt. In following this path, tension is applied to the tail end drum or roller. The surplus power generated by the motors is greatly in excess of any tension which would be applied to the tail end drum or roller by normal tension weights to ensure an effective grip between the driving belt and the driving drum, and would therefore tend to move said tail end drum or roller rapidly, and introduce slack into the drive belt at some point.

The primary object of the present invention is therefore to provide means applicable to conveyors of the kind referred to for maintaining the driving member in effective driving engagement with the conveyor member, particularly in the condition where some sections of the conveyor member are loaded, and some sections are unloaded.

According to the invention, there are provided tensioning means for said driving member comprising a drum or roller around which the driving member is to be passed, biassing means connected to said drum or roller for urging said drum or roller in a direction to tension the driving member and a dashpot device opposing movement of said drum or roller in the opposite direction.

The invention further provides a belt conveyor having an endless conveyor belt wrapping and intended to be driven by frictional engagement with the upper flight of at least one endless driving belt trained around end drums or rollers and driven by a series of motors, said conveyor being provided with tensioning means as hereinbefore set out.

One embodiment of the invention will be described by way of example only in connection with a belt conveyor as described in the specification of my co-pending patent application Serial No. 332,519, filed December 23, 1963. Reference is made to the accompanying drawing which shows a side elevation of the conveyor.

An endless driving belt 10 is trained in sinuous manner around a series of driving drums or rollers 11 spaced apart in tandem. Each driving drum or roller 11 is associated with idler drums or rollers 12 to assist in maintaining the belt taut. The left-hand end of the belt 10 as shown in the drawing is trained around an end drum 13 associated with a tensioning mechanism as hereinafter described. An endless conveyor belt 14 wraps the driving belt 10 and is itself trained around end drums or rollers 15 with the upper and the lower flights of the conveyor belt 14 in engagement with, respectively, the upper and the lower flights of the driving belt 10, so that, during rotation of the driving belt 10, the conveyor belt 14 is rotated solely by frictional engagement with the upper and the lower flights of the driving belt. Each driving drum 11 is driven by a motor and each of the motors generates the same horsepower.

It is essential in the condition where some sections of the conveyor belt are loaded, and some sections of said belt are unloaded that the tail end drum or roller 13 should be maintained in a position which will ensure effective driving engagement of the driving drums or rollers 11 with the driving belt 10. The tail end drum or roller 13 of the driving belt 10 is therefore connected to one end of a cable 16 which passes over a pulley 17 located outside the driving belt and under a second pulley 18 and is connected at its other end to a winch 19 operable either manually or mechanically.

A piston rod 20 of a hydraulic piston and cylinder assembly 21 constituting a dashpot is connected at its upper end to the second pulley 18 and depends therefrom. A piston 22 mounted on the piston rod 20 intermediate the ends of said rod is slidable in a vertically disposed cylinder 23 of the assembly. The piston rod projects below the cylinder 23 and is connected at its lower end to biassing means in the form of a weight 24.

The upper and the lower end portions of the side wall of the cylinder 23 are each formed with two diametrically opposed ports. One port at the upper end of the cylinder is connected to one port at the lower end of the cylinder by a duct 25 in which is intercalated a non-return valve 26 arranged to permit flow of hydraulic fluid only from said lower port to said upper port. The other port at the upper end of the cylinder is connected to the other port at the lower end of the cylinder by a duct 27 in which is intercalated a restrictor 28 adapted, during upward movement of the piston 22 in the cylinder 23, to restrict the rate of said upward movement.

The end drum or roller 15 of the conveyor belt 14 adjacent to the dashpot arrangement is connected to one end of a cable 29 which passes over a pulley 30 outside the conveyor belt and is connected at the other end to a weight 31 to assist in maintaining taut the load-bearing flight of the conveyor belt 14.

In practice, during operation of the conveyor, the weight 24 of the dashpot arrangement exerts a biassing influence on the associated end drum or roller 13 in that the weight 24 tends to move downwardly to urge said drum or roller 13 in the direction away from the drum or roller 11 at the opposite end of the driving belt 10, the degree of freedom of downward movement of said weight 24 and thus of the piston 22 being controlled by the dimensions of the non-return valve 26 through which fluid can flow from the lower end of the cylinder below the piston to the upper end of the cylinder. During operation of the conveyor, and in particular in the condition where some sections of the conveyor belt are loaded and some sections are unloaded, which condition is normally a temporary condition coming at the start and at the finish of a run of material on the conveyor, the weight 24, together with the restraint offered by the restrictor 28 of the dashpot, will ensure that the tail end drum or roller 13 associated with the dashpot arrangement will remain in such a position that the driving belt 10 remains in effective contact with the driving drums or rollers 11, and slack is not allowed to become cumulative in the driving belt. The speed of the piston 22 upwardly will be restrained by the restrictor 28, and the stroke and the diameter of the piston 22 and the rate of flow of fluid through the restrictor 28 will be such that any point on the conveyor belt 14 will travel the full length of the conveyor in less time than is required for the dashpot piston 22 to make its upward stroke. When the uneven loading along the conveyor disappears, then there is no tendency for any of the motors to generate surplus power and the dashpot piston 22 will return under the influence of the biassing weights to its bottom position. However, if it is desired at any time to adjust the relative positions of the tail end drum or roller 13 and the head end drum or roller 11, the tail end drum or roller 13 is moved to the desired position and the winch 19 is operated to move the dashpot piston 22 to its correct position.

It is to be understod that while the invention has been described particularly in connection with a single driving belt, the use of a series of shorter endless driving belts as described in the hereinbefore mentioned specification of application Serial No. 332,519, filed December 23, 1963, will necessitate the provision of tensioning means of the present invention for each of selected end drums or rollers of said shorter belts.

I claim:

1. A conveyor comprising an endless conveyor member, an endless flexible driving member in frictional driving engagement with the endless conveyor member over a substantial part of the length of the driving member, rollers around which the driving member passes, biassing means connected to at least one of said rollers urging said roller in a direction to tension the driving member and dashpot means connected to said roller and opposing movement thereof in the direction opposite to the first said direction.

2. A conveyor according to claim 1 wherein said dashpot means comprises a hydraulic cylinder, a double-acting piston in said cylinder, means connecting the piston to said roller, conduits interconnecting opposite ends of said cylinder, a non-return valve in one of said conduits permitting movement of the piston in one direction and a restrictor in another of said conduits providing restraint to movement of the piston in the other direction.

3. A conveyor according to claim 2 wherein said biassing means comprise a weight connected to said piston.

4. A conveyor according to claim 3 wherein means are provided for adjusting the position of the piston in the cylinder.

5. A conveyor according to claim 1 wherein said roller is an end roller of said driving member.

6. For an endless flexible driving member adapted to drive an endless conveyor member by frictional engagement therewith over a susbtantial part of the length of the driving member, tensioning means comprising a roller engageable by said driving member, biasing means adapted to urge said roller in a direction to tension the driving member and dashpot means opposing movement of the roller in the opposite direction.

7. For an endless flexible driving member adapted to drive an endless conveyor member by frictional engagement therewith over a substantial part of the length of the driving member, tensioning means comprising a roller engageable by said driving member, a weight, means connecting said weight to said roller whereby the roller is urged in a direction to tension the driving member, a hydraulic cylinder, a piston in said cylinder and connected to said roller, a one-way valve between opposite sides of said piston permitting movement of the roller in said direction and a constricted connection between opposite sides of said piston providing resistance to movement of said roller in the opposite direction.

References Cited by the Examiner

UNITED STATES PATENTS

| 2,326,098 | 8/1943 | Kimmich | 198—203 |
| 2,863,555 | 12/1958 | Jaritz | 108—203 |

EVON C. BLUNK, *Primary Examiner.*

R. KRISHER, *Assistant Examiner.*